United States Patent
Takao et al.

(10) Patent No.: US 8,457,845 B2
(45) Date of Patent: Jun. 4, 2013

(54) SEATBELT CONTROL APPARATUS

(75) Inventors: Masato Takao, Tokyo (JP); Daisuke Murakami, Tokyo (JP)

(73) Assignee: Takata Corporation, Tokyo (JP)

( * ) Notice: Subject to any disclaimer, the term of this patent is extended or adjusted under 35 U.S.C. 154(b) by 813 days.

(21) Appl. No.: 12/588,245

(22) Filed: Oct. 8, 2009

(65) Prior Publication Data

US 2010/0125392 A1 May 20, 2010

(30) Foreign Application Priority Data

Nov. 19, 2008 (JP) ................................. 2008-295700

(51) Int. Cl.
*B60R 22/00* (2006.01)

(52) U.S. Cl.
USPC .............................. 701/45; 180/268; 297/477

(58) Field of Classification Search
USPC . 701/45, 34.4; 180/268, 269, 270; 280/801.1, 280/735; 297/468, 474–479
See application file for complete search history.

(56) References Cited

U.S. PATENT DOCUMENTS

| | | | | |
|---|---|---|---|---|
| 4,708,365 A | * | 11/1987 | Nakano et al. | 280/801.1 |
| 6,257,363 B1 | * | 7/2001 | Midorikawa et al. | 180/268 |
| 7,180,258 B2 | * | 2/2007 | Specht et al. | 318/432 |
| 2003/0226704 A1 | * | 12/2003 | Aoki et al. | 180/271 |
| 2005/0146128 A1 | * | 7/2005 | Midorikawa et al. | 280/807 |
| 2005/0252710 A1 | * | 11/2005 | Akaba et al. | 180/268 |
| 2008/0265551 A1 | * | 10/2008 | Odate | 280/733 |
| 2009/0243367 A1 | * | 10/2009 | Tanaka et al. | 297/475 |

FOREIGN PATENT DOCUMENTS

| | | |
|---|---|---|
| JP | 2005-263077 | 9/2005 |
| JP | 2006-142984 A | 6/2006 |
| JP | 2008 143275 A | 6/2008 |

* cited by examiner

*Primary Examiner* — Darnell Jayne
*Assistant Examiner* — Sasha T Varghese
(74) *Attorney, Agent, or Firm* — Foley & Lardner LLP

(57) ABSTRACT

A seatbelt control apparatus includes seatbelt control means that controls a motor for retracting a seatbelt; and motor current detecting means that detects a current of the motor. The seatbelt control apparatus further includes jamming determination means, indicator detecting means, and threshold value setting means. The jamming determination means determines whether or not the seatbelt is jammed during take-up operation on the basis of whether or not the motor current detected by the motor current detecting means exceeds a threshold value for jamming determination. The indicator detecting means detects an indicator of a current versus load characteristic of the motor. The threshold value setting means sets the threshold value for jamming determination on the basis of the indicator detected by the indicator detecting means.

8 Claims, 12 Drawing Sheets

SEATBELT CONTROL APPARATUS

BACKGROUND

The present application relates to a seatbelt control apparatus, a seatbelt apparatus, and a seatbelt control method which controls taking-up of a seatbelt.

The seat of a vehicle such as a motor vehicle or the like is provided with a seatbelt apparatus for restraining an occupant in the seat. The seatbelt apparatus consists of a belt (webbing), a buckle, a tongue plate, and a retractor and the like. For example, Japanese Unexamined Patent Application Publication No. 2005-263077 (incorporated by reference herein) discloses a seatbelt apparatus that determines whether a seatbelt is jammed in an occupant or the like on the basis of whether a motor current exceeds a threshold for jam determination while a seatbelt is being retracted. It would be advantageous to improve the accuracy of the jam determination.

SUMMARY

One disclosed embodiment relates to a seatbelt control apparatus including seatbelt control means that controls a motor for retracting a seatbelt; and motor current detecting means that detects a current of the motor. The seatbelt control apparatus further includes jamming determination means, indicator detecting means, and threshold value setting means. The jamming determination means determines whether or not the seatbelt is jammed during take-up operation on the basis of whether or not the motor current detected by the motor current detecting means exceeds a threshold value for jamming determination. The indicator detecting means detects an indicator of a current versus load characteristic of the motor. The threshold value setting means sets the threshold value for jamming determination on the basis of the indicator detected by the indicator detecting means.

Another embodiment relates to a seatbelt apparatus including a motor; a spool that takes up a seatbelt in conjunction with rotation of the motor, the spool being connected to the rotating shaft of the motor; and seatbelt control means that controls the motor. The seatbelt apparatus further includes jamming determination means, indicator detecting means, and threshold value setting means. The jamming determination means determines whether or not the seatbelt is jammed during take-up operation on the basis of whether or not the motor current detected by the motor current detecting means exceeds a threshold value for jamming determination. The indicator detecting means detects an indicator of a current versus load characteristic of the motor. The threshold value setting means sets the threshold value for jamming determination on the basis of the indicator detected by the indicator detecting means.

Yet another embodiment relates to a seatbelt control method including a motor current detecting step, a jamming determination step, an indicator detecting step, and a threshold value setting step. The motor current detecting step detects a current of a motor for retracting a seatbelt. The jamming determination step determines whether or not the seatbelt is jammed during take-up operation on the basis of whether or not the motor current detected by the motor current detecting step exceeds a threshold value for jamming determination. The indicator detecting step detects an indicator of a current versus load characteristic of the motor. The threshold value setting step sets the threshold value for jamming determination on the basis of the indicator detected by the indicator detecting means.

Still another exemplary embodiment relates to a program enabling a computer to carry out processing including a motor current detecting step, a jamming determination step, an indicator detecting step, and a threshold value setting step. The motor current detecting step detects a current of a motor for retracting a seatbelt. The jamming determination step determines whether or not the seatbelt is jammed during take-up operation on the basis of whether or not the motor current detected by the motor current detecting step exceeds a threshold value for jamming determination. The indicator detecting step detects an indicator of a current versus load characteristic of the motor. The threshold value setting step sets the threshold value for jamming determination on the basis of the indicator detected by the indicator detecting means.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
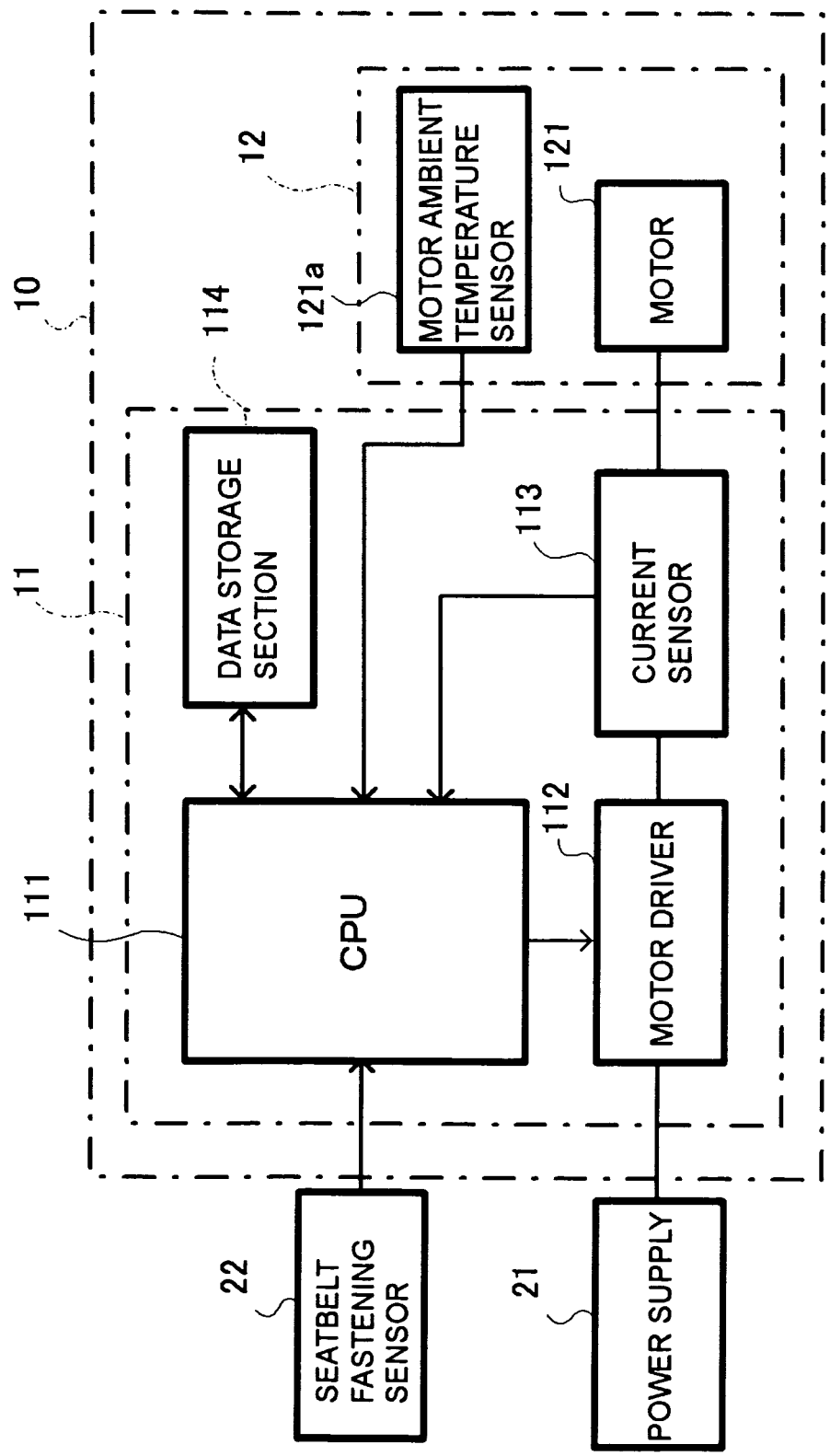
FIG. 1 is a block diagram showing an example of a configuration and connection of a seatbelt retractor according to an exemplary embodiment.

One disclosed embodiment relates to a seatbelt control apparatus including seatbelt control means that controls a motor for retracting a seatbelt; and motor current detecting means that detects a current of the motor. The seatbelt control apparatus further includes jamming determination means, indicator detecting means, and threshold value setting means.

The jamming determination means determines whether or not the seatbelt is jammed during take-up operation on the basis of whether or not the motor current detected by the motor current detecting means exceeds a threshold value for jamming determination. The indicator detecting means detects an indicator of a current versus load characteristic of the motor. The threshold value setting means sets the threshold value for jamming determination on the basis of the indicator detected by the indicator detecting means.

In the seatbelt control apparatus, the indicator detecting means may be adapted to detect the surrounding temperature of the motor, and the threshold value setting means may be adapted to set the threshold value for jamming determination on the basis of the surrounding temperature of the motor.

The indicator detecting means may be adapted to detect as the indicator a motor current when the motor is rotated under a predetermined condition. The threshold value setting means may be adapted to set the threshold value for jamming determination on the basis of the motor current detected by the indicator detecting means.

The indicator detecting means may be adapted to detect as the indicator the surrounding temperature of the motor and the motor current when the motor is rotated under a predetermined condition. The threshold value setting means may be adapted to set the threshold value for jamming determination on the basis of the motor surrounding temperature and the motor current detected by the indicator detecting means.

The indicator detecting means may be adapted to detect a motor current when the motor is rotated in a direction opposite to the direction in which the seatbelt is retracted.

Another embodiment relates to a seatbelt apparatus including a motor; a spool that takes up a seatbelt in conjunction with rotation of the motor, the spool being connected to the rotating shaft of the motor; and seatbelt control means that controls the motor. The seatbelt apparatus further includes jamming determination means, indicator detecting means, and threshold value setting means. The jamming determination means determines whether or not the seatbelt is jammed during take-up operation on the basis of whether or not the motor current detected by the motor current detecting means exceeds a threshold value for jamming determination. The indicator detecting means detects an indicator of a current versus load characteristic of the motor. The threshold value setting means sets the threshold value for jamming determination on the basis of the indicator detected by the indicator detecting means.

A one-way clutch may be provided. The rotating shaft of the motor may be connected to the spool via the one-way clutch. The indicator detecting means may be adapted to detect a current when the motor is rotated in a direction in which an engagement with the one-way clutch is not attained.

Another embodiment relates to a seatbelt control method including a motor current detecting step, a jamming determination step, an indicator detecting step, and a threshold value setting step. The motor current detecting step detects a current of a motor for retracting a seatbelt. The jamming determination step determines whether or not the seatbelt is jammed during take-up operation on the basis of whether or not the motor current detected by the motor current detecting step exceeds a threshold value for jamming determination. The indicator detecting step detects an indicator of a current versus load characteristic of the motor. The threshold value setting step sets the threshold value for jamming determination on the basis of the indicator detected by the indicator detecting means.

Another exemplary embodiment relates to a program enabling a computer to carry out processing including a motor current detecting step, a jamming determination step, an indicator detecting step, and a threshold value setting step. The motor current detecting step detects a current of a motor for retracting a seatbelt. The jamming determination step determines whether or not the seatbelt is jammed during take-up operation on the basis of whether or not the motor current detected by the motor current detecting step exceeds a threshold value for jamming determination. The indicator detecting step detects an indicator of a current versus load characteristic of the motor. The threshold value setting step sets the threshold value for jamming determination on the basis of the indicator detected by the indicator detecting means.

According to one embodiment, a seatbelt control apparatus is installed in an ECU (Electronic Control Unit) 11 of a motor vehicle as shown in FIG. 1. The ECU 11 controls a motor 121 of a motor retractor 12. The ECU 11 and the motor retractor 12 are provided in a seatbelt retractor 10 for automatically retracting a seatbelt. As shown in FIG. 1, the ECU 11 has a CPU (Central Processing Unit) 111, a motor driver 112, a current sensor 113, and a data storage section 114. Although not illustrated, the ECU 11 also includes ROM (Read Only Memory) and RAM (Random Access Memory) and the like.

The CPU 111 controls at least a portion of the operation of the seatbelt. Various types of sensors such as a seatbelt fastening sensor 22 (to be detailed later) and the like are connected to the CPU 111 (e.g., via a cord, wire, cable, etc.). To perform vehicle control, the CPU 111 executes a control program stored in the ROM or the like while causing, for example, the RAM to temporarily store various types of data. At this time, sensor information is used, if needed.

The data storage section 114 includes a writable memory such as an EEPROM (Electrically Erasable PROM) or a flash memory. The data storage section 114 (e.g., data storage portion) includes a parameter, a table, a flag, and the like for use in control stored or updated in advance or during control.

The motor driver 112 is electrically connected to the CPU 111 and a power supply 21. The motor driver 112 drives the motor 121 in accordance with a control signal from the CPU 111. The power supply 21 (e.g., an in-vehicle battery) supplies a power supply voltage to the motor driver 112. The current sensor 113 is disposed between, for example, the motor driver 112 and the motor 121. The current sensor 113 detects the value of a current flowing through the motor 121 and outputs the detected value to the CPU 111.

Figure 2:
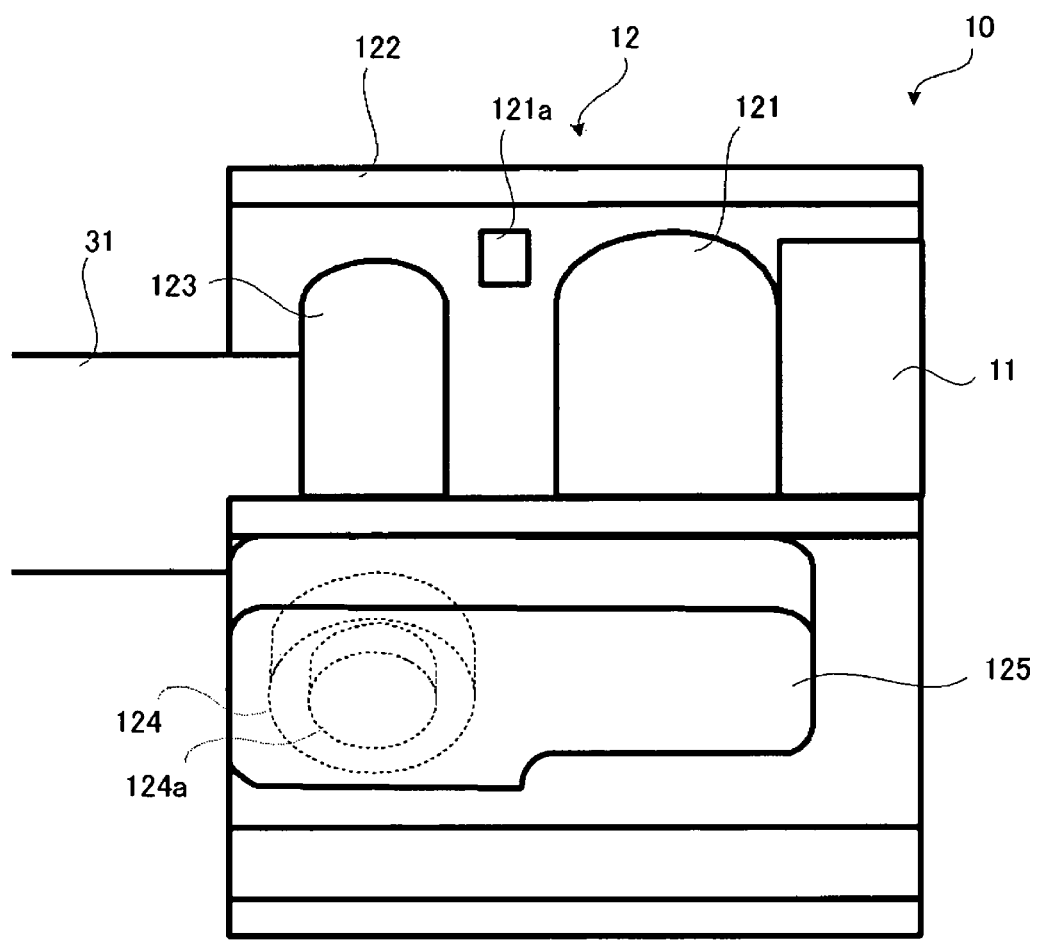
FIG. 2 is a diagram showing the configuration of a motor retractor according to an exemplary embodiment.

As shown in, for example, FIG. 2, the motor retractor 12 controlled by the ECU 11 includes the motor 121, a temperature sensor 121*a*, a frame 122, a spool 123, a return spring 124 (urging means), and a power transmission mechanism 125. The frame 122 is a substantially U-shaped framework of the motor retractor 12. The frame 122 supports various components such as the ECU 111 and the motor 121, that are secured to the frame 122 in the form as shown in FIG. 2. The temperature sensor 121*a* is coupled to the frame 122 proximate to the motor 121 and detects the temperature of the motor 121.

The motor 121 is an electric motor with a rotating shaft coupled to the spool 123. The motor 121 is rotatable in both forward and backward directions. The motor 121 rotatably drives the spool 123. The spool 123 is a component around which a belt 31 is wound. The spool 123 is rotatably secured to the frame 122. The spool 123 is connected to a return spring 124.

The power transmission mechanism 125 includes the afore-mentioned return spring 124, a predetermined number of, for example, gears, and a one-way clutch 124*a* that is brought into engagement in the direction in which the belt 31 is retracted. The power transmission mechanism 125 transmits power generated by the motor 121 to the spool 123 through the one-way clutch 124a or the like. The power transmission mechanism 125 is secured to, for example, the frame 122. The return spring 124 is directly connected to the spool 123.

According to an exemplary embodiment, the return spring 124 is a flat spiral spring. The return spring 124 is incorporated in the power transmission mechanism 125. The return spring 124 biases the spool 123 in the retraction direction of the belt 31. If the motor 121 is not activated and no withdrawing force is applied to the belt 31, the urging force of the return spring 124 acts on the belt 31, causing the belt 31 to be retracted. The return spring 124 is loosened or relaxed when the motor 121 rotates in the retraction direction of the belt 31. Greater retracted amount of the belt 31 results in weaker retracting force of the return spring 124. The retracting force is configured such that it does not give an occupant a feeling of tightness. In contrast, retracting force of the motor 121 is set greater than that of the return spring 124.

The motor 121 is coupled to the spool 123 via the one-way clutch 124a of the power transmission mechanism 125. This arrangement prevents the belt 31 from being drawn (being moved) even if the motor 121 is reversed. When the belt 31 is retracted only with the return spring 124, the motor 121 does not rotate (the return spring 124 does not cause the motor 121 to rotate). In contrast, when the occupant draws the belt 31, the motor 121 rotates (reverses). For example, when an occupant with his/her upper body bent forward (with the belt 31 significantly drawn) returns his/her upper body into contact with the seat back, the belt 31 is retracted by the return spring 124 so that the belt 31 is laid on and along the body of the occupant. At this time, the motor 121 does not rotate. For this reason, even take-up force of the return spring 124 is sufficient to prevent the belt 31 from sagging when the belt 31 is retracted.

Figure 3:
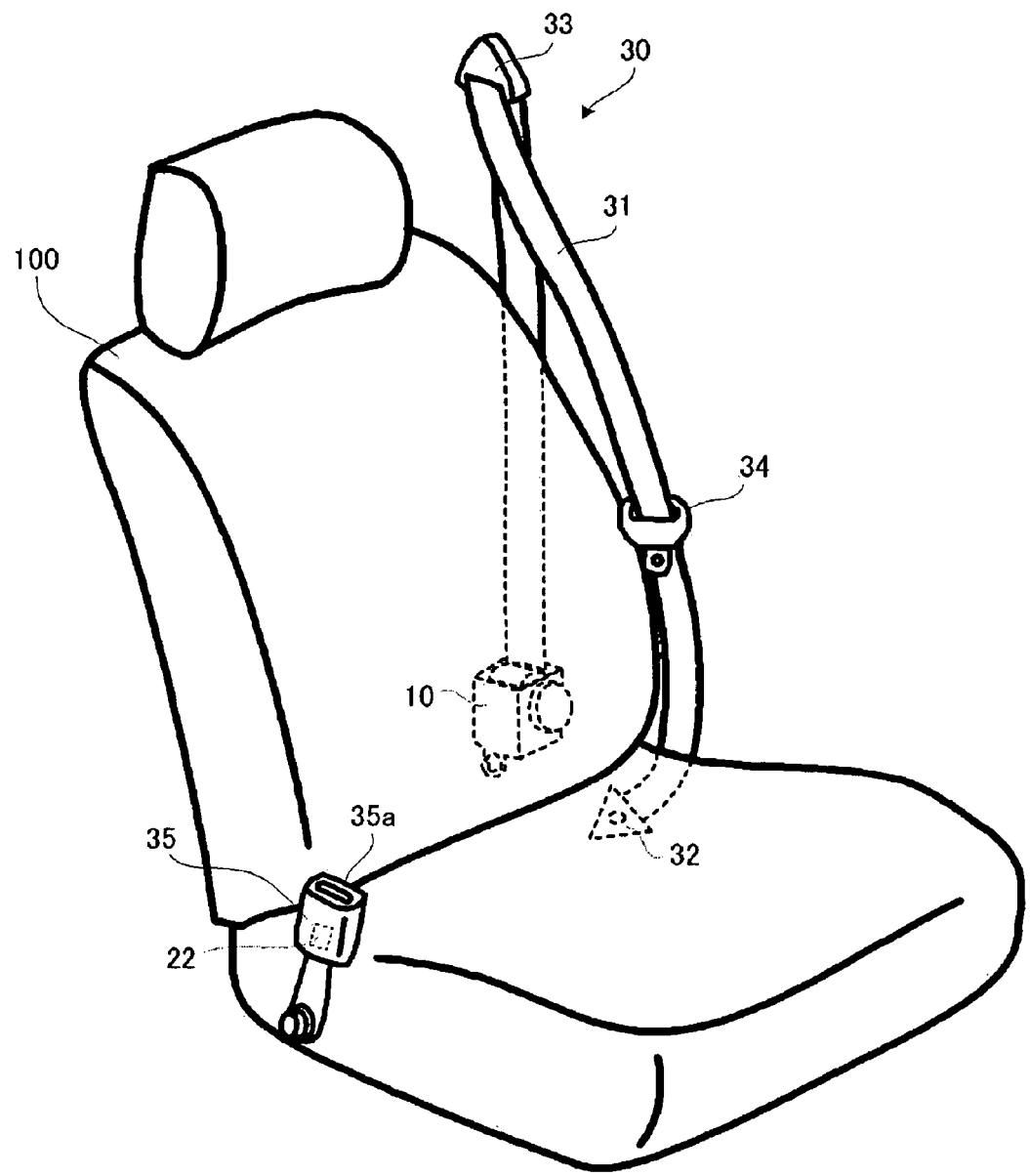
FIG. 3 is a perspective view showing the configuration of a seatbelt apparatus according to an exemplary embodiment.

A seatbelt retractor 10 (FIG. 2) as described above is used in, for example, a seatbelt apparatus 30 as shown in FIG. 3. The seatbelt apparatus 30 includes the seatbelt retractor 10, a belt 30 (e.g., seatbelt, webbing, etc.), a belt anchor 32, a guide anchor 33, a tongue plate 34, and a buckle 35. The seatbelt retractor 10 is installed in, for example, a vehicle seat 100 (driver's seat, a passenger seat, a rear seat, and the like). The seatbelt retractor 10 is secured to, for example, the inside of the side of a vehicle body.

The belt 31 restrains an occupant in a seat. The belt 31 extends between the seatbelt retractor 10 and the belt anchor 32. The belt anchor 32 secures one end of the belt 31 to the passenger compartment of a vehicle, such as to the floor of the vehicle body or the seat. The belt 31 is folded back the belt 31 in the vicinity of the shoulder of an occupant by the guide anchor 33. The guide anchor 33, through which the belt 31 is inserted, is secured to the side of a vehicle.

The belt 31 is fastened down to restrain the occupant with the tongue plate 34 and the buckle 35. The tongue plate 34 is slidably supported on the belt 31 that is folded back at the guide anchor 33. The buckle 35 has an insertion opening (slot) 35a formed in the vicinity of the waist of an occupant. When the tongue plate 34 is inserted into the insertion opening 35a, the tongue plate 34 is releasably engaged with the buckle 35.

The seatbelt fastening sensor 22 (see FIG. 1) is provided in the buckle 35 for detecting that the tongue plate 34 is engaged. While the tongue plate 34 is engaged with the buckle 35, a signal detected by the seatbelt fastening sensor 22 is outputted to the seatbelt retractor 10 (specifically the CPU 111 as shown in FIG. 1) through a cord. For this reason, the ECU 111 can detect that the belt 31 is fastened or released according to the presence of the signal from the seatbelt fastening sensor 22.

Figure 4:
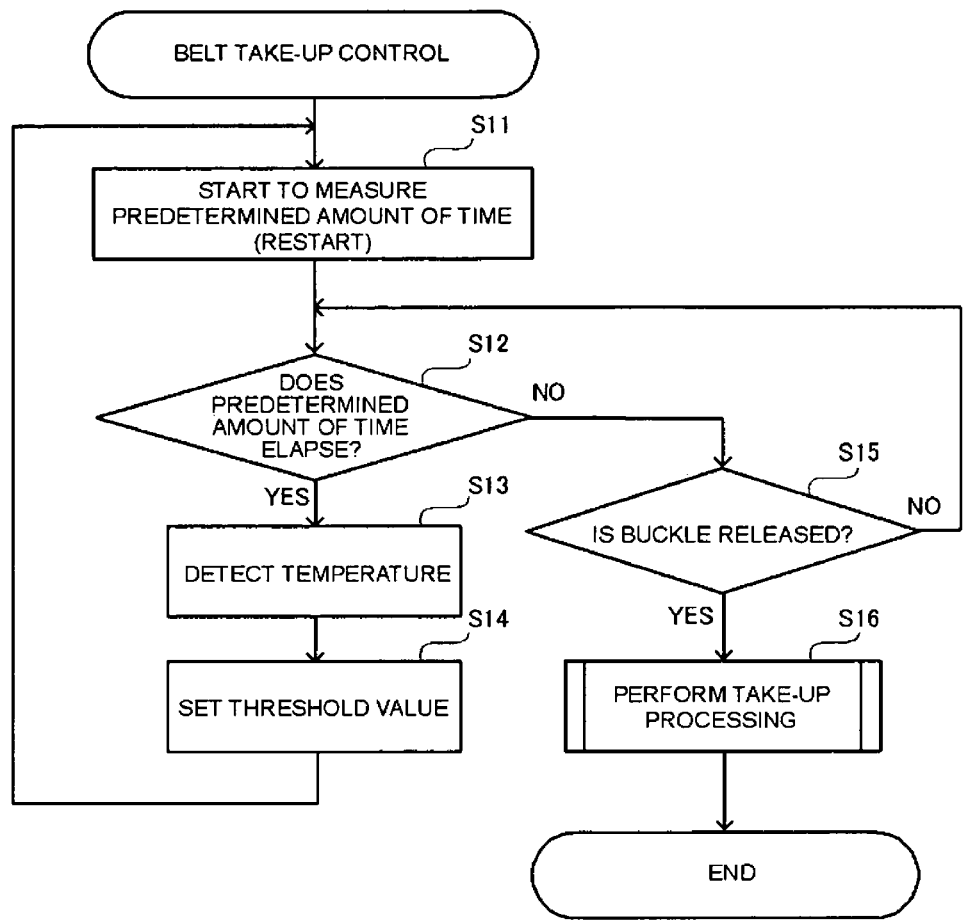
FIG. 4 is a flowchart illustrating belt take-up control according to an exemplary embodiment.
Figure 6:
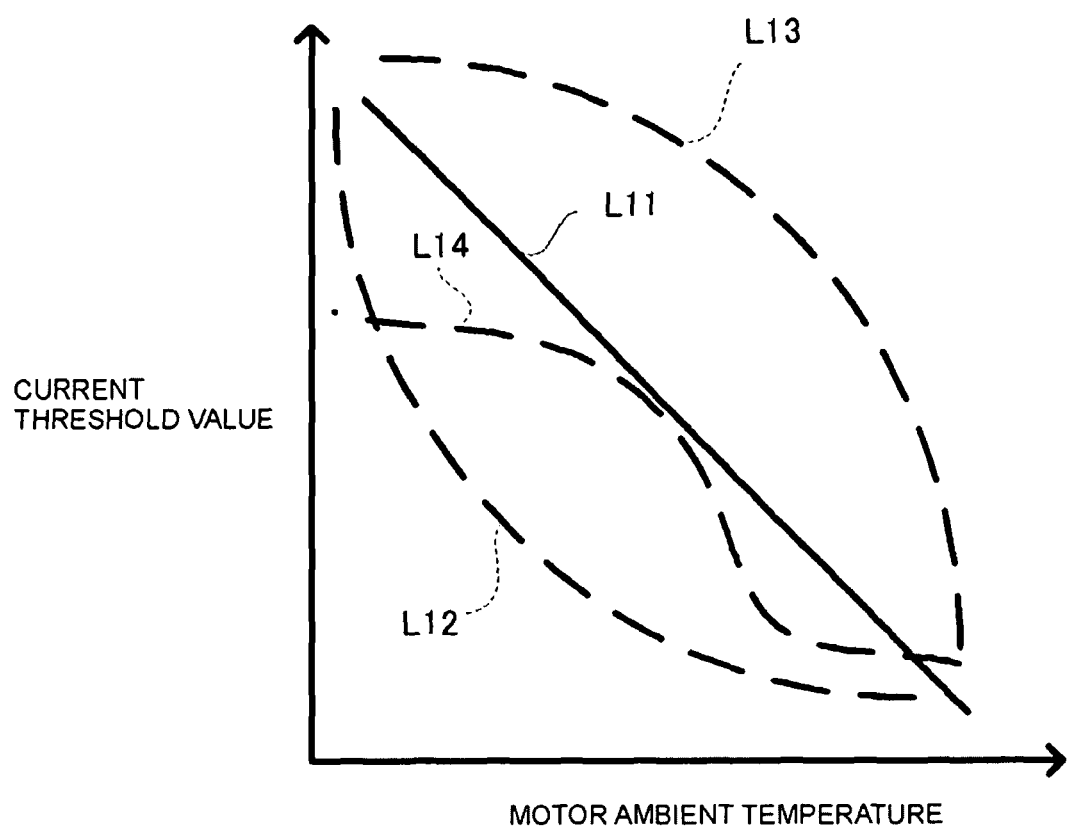
FIG. 6 is a graph showing an example of a map for use in setting of a threshold value for jamming determination according to an exemplary embodiment.

The seatbelt retractor 10 repeatedly performs, for example, a series of processing steps (belt retraction control) as shown in FIGS. 4 and 6. In these processing steps, the CPU 111 in, for example, the ECU 11 reads out and executes a predetermined program from the ROM.

In step S11 of the processing steps as shown in FIG. 4, the CPU 111 starts a counter and begins to measure time (predetermined amount of time). In the following step S12, the CPU 111 determines whether a predetermined amount of time has elapsed since the counter was started in step S11. If in step S12 the CPU 111 determines that the predetermined amount of time has elapsed, the CPU 111, in step S13, detects the surrounding temperature of the motor 121 through the motor surrounding temperature sensor 121a.

A graph of current versus load characteristics for the motor 121 exhibits rise and fall of the values or changes of slope and form depending on the surrounding temperature of the motor. This results from the effect of the motor surrounding temperature on the motor 121, the power transmission mechanism 125 (power transmission gear or the like), and the belt 31 (webbing). In other words, mechanical loss of the motor 121 related to rotation varies with changes in the motor surrounding temperature, which causes a motor current value to change in accordance with the motor surrounding temperature even under the same jamming tension condition. Lower motor surrounding temperatures causes higher mechanical loss related to rotation of the motor 121, resulting in a greater load exerted on the motor 121, which increases a motor current. The jamming tension refers to a motor load above which the belt 31 is regarded to be jammed in an occupant or the like during its take-up operation.

Figure 5:
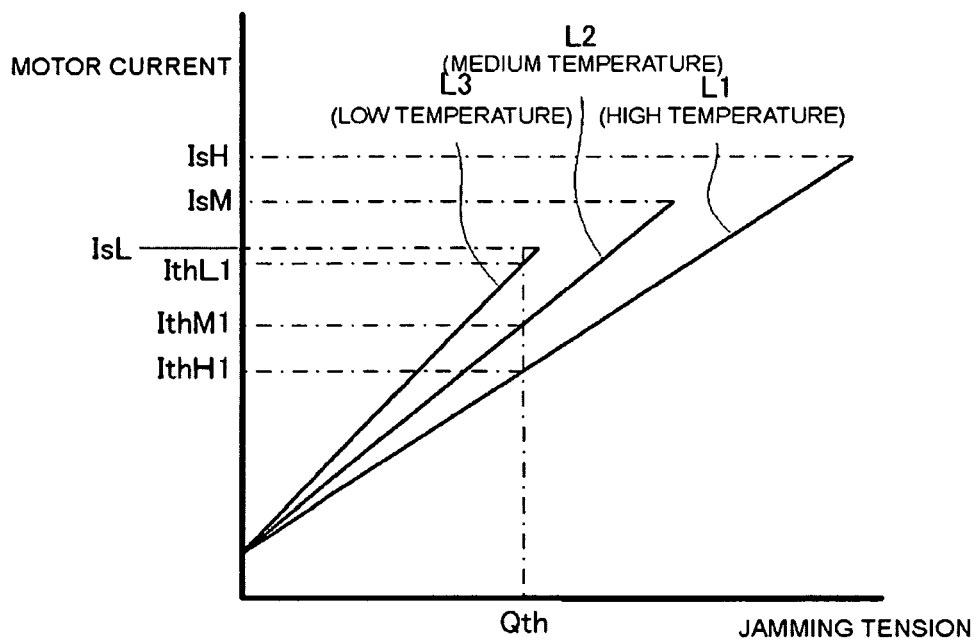
FIG. 5 is a graph showing an example of a relationship between a motor current and a jamming tension according to an exemplary embodiment.

In this embodiment, the motor surrounding temperature provides an indicator of the current versus load characteristics. Specifically, FIG. 5, for example, shows an example of the relationship of motor current and jamming tension which corresponds to the current versus load characteristics of the motor 121. In FIG. 5, current values IsL, IsM, and IsH correspond to stalling currents (current at torque at which a motor stalls) at low, medium, and high motor surrounding temperatures, respectively. As shown in FIG. 5, lower motor surrounding temperatures, namely, Line L3 (low temperature characteristics) produces a greater slope of the graph than Line L2 (medium temperature characteristics), and Line L2 produces a greater slope than Line L1 (high temperature characteristics). Accordingly, the current versus load characteristics can be detected (determined) on the basis of the motor surrounding temperature detected by the motor surrounding temperature sensor 121a. For example, at low motor surrounding temperatures Line L3 corresponds to low-temperature current versus load characteristics, at medium motor surrounding temperatures Line L2 corresponds to medium-temperature current versus load characteristics, and at high motor surrounding temperatures Line L1 corresponds to high-temperature current versus load characteristics.

In the following step S14, in accordance with an appropriate temperature the CPU 111 sets a motor current corresponding to a jamming tension as a threshold value for jamming determination. In an example as shown in, for example, FIG. 5, when a jamming tension is a value Qth, a current value IthL1 on Line L3, a current value IthM1 on Line L2, and a current value IthH1 on Line L1 are set as threshold current values for low motor surrounding temperatures, medium surrounding temperatures, and high motor surrounding temperatures, respectively.

To set a threshold current for jamming tension, it is effective to, for example, provide a map of the relationship between the motor surrounding temperature and the motor current corresponding to jamming tension and store the map in, for example, the data storage section 114. This allows the threshold current to be set using the map. Users can use any map, depending on the relationship between the motor surrounding temperature and the motor current corresponding to jamming tension.

Specifically, using, for example, the maps L11 through L14 as shown in FIG. 6, a greater value is set as the threshold value as the motor surrounding temperature becomes lower. In other words, using, for example, the map L11, the threshold value is varied on a linear basis depending on the changes in the motor surrounding temperature. Also, like the map L12, the threshold value may be significantly varied in a low-temperature zone of the motor surrounding temperature, while like the map L13 the threshold value may be significantly varied in a high-temperature zone of the motor surrounding temperature. Furthermore, like the map L14, the threshold value may be largely varied in a specific temperature zone of the motor surrounding temperature, while the threshold value may be saturated at a temperature above or below a predetermined temperature. The threshold value may be altered on a continuous or discontinuous (for example, step-by-step) basis, depending on the motor surrounding temperature. In addition, two or more different threshold values may be switched therebetween, depending on the motor surrounding temperature.

The CPU 111 sets (updates or corrects) a motor current corresponding to a jamming tension as a threshold current in step S14. Then, the flow returns to step S11. In step S11, the CPU 111 restarts the counter again and again begins to measure time (predetermined amount of time).

In contrast, if in step S12 the CPU 111 determines that the predetermined amount of time has not elapsed, the CPU 111 determines in step S15 whether or not the buckle 35 has been released on the basis of a signal from the seatbelt fastening sensor 22. If in step S15 the CPU 111 detects that the buckle 35 has been released, the CPU 111 performs belt take-up processing in step S16 as shown in FIG. 7.

Figure 7:
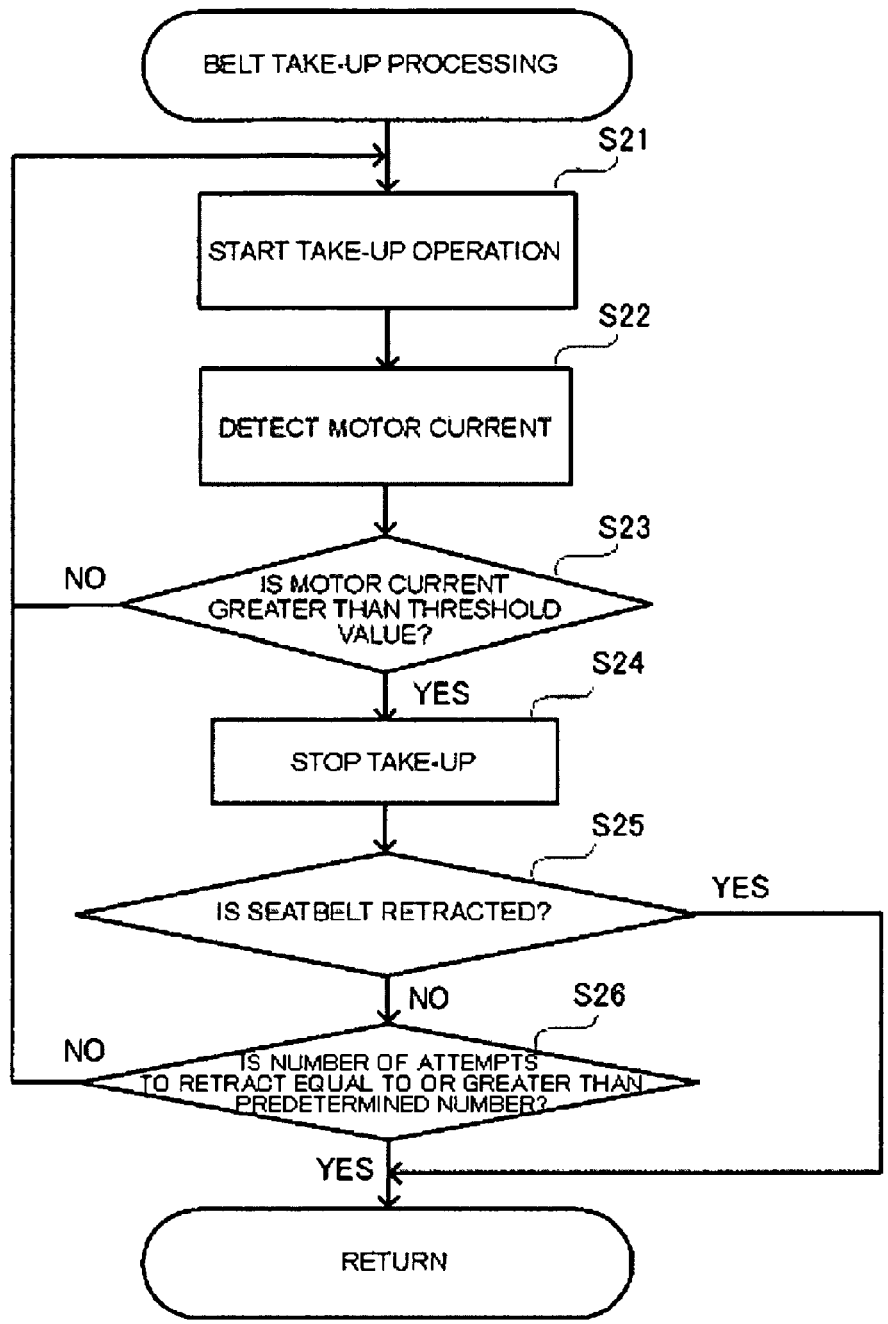
FIG. 7 is a flowchart illustrating belt take-up processing according to an exemplary embodiment.

In step 21 of the processing steps shown in FIG. 7, the CPU 111 starts take-up operation. Specifically, the CPU 111 reads out a control parameter corresponding to an appropriate situation from, for example, a table stored in the data storage section 114. Then, the CPU 111 generates a PWM (Pulse Width Modulation) signal having a predetermined duty ratio in accordance with the control parameter. The CPU 111 outputs the PWM signal and a control signal for specifying the rotational direction of the motor 121 to the motor driver 112. The motor driver 112 receiving these signals generates a drive voltage by regulating the power supply voltage with the PWM signal. Then the motor driver 112 applies the drive voltage to the motor 121, thereby causing the motor 121 to rotate at a speed based on the duty ratio of the drive voltage. As a result, the belt 31 is retracted onto the spool 123.

In the following step S22, the CPU 111 detects a motor current with the current sensor 113.

In the following step S23, the CPU 111 determines whether or not the motor current detected in step S22 exceeds the threshold value for jamming determination (motor current greater than threshold value).

In step S23, if the CPU 111 determines that the motor current does not exceed the threshold value for jamming determination, the flow returns to step S21 to continue belt take-up operation.

On the other hand, if the CPU 111 determines in step S23 that the motor current exceeds the threshold value for jamming determination, the belt 31 may have been jammed in an occupant or the like during take-up operation. Accordingly, in step S24, the CPU 111 terminates the take-up operation.

In the following step S25, the CPU 111 determines whether or not the belt 31 has been completely retracted. If the CPU 111 determines in step S25 that the belt 31 has been retracted, the CPU 111 terminates the belt take-up processing, which means that take-up of the belt 31 has been completed.

On the other hand, if the CPU 111 determines in step S25 that the belt 31 has not been retracted, the CPU 111 determines whether or not the number of attempts to retract is greater than a predetermined number of attempts. If it is determined in step S26 that the number of attempts to retract has not reached the predetermined number of attempts, the flow returns to S21 to resume belt take-up operation. If the belt 31 has not been completely retracted despite the predetermined number of attempts to retract, the CPU 111 terminates take-up processing.

Processing (belt take-up processing) as shown in FIG. 4 ends when processing in step S16 (belt take-up processing shown in FIG. 7) is terminated.

The seatbelt retractor 10 according to an exemplary embodiment detects the motor surrounding temperature on a periodic basis through the processing steps described above. Every time the motor surrounding temperature is detected, a threshold value for jamming determination is set on the basis of the detected motor surrounding temperature. Then, on the basis of the determination as to whether or not the motor current associated with take-up operation exceeds the threshold value, it is determined whether the belt 31 is jammed during take-up operation. This allows the motor current corresponding to jamming tension to be set with a higher degree of accuracy on the basis of the motor surrounding temperature just before the belt 31 is subjected to belt take-up processing. Consequently, seatbelt jamming can be determined with a higher degree of accuracy.

Alternative embodiments will be described below. The apparatus configuration in these embodiments is similar to the embodiment described above (as shown in FIGS. 1 to 3), and, therefore, repeated descriptions of the same sections are omitted for the sake of simplicity.

Figure 8:
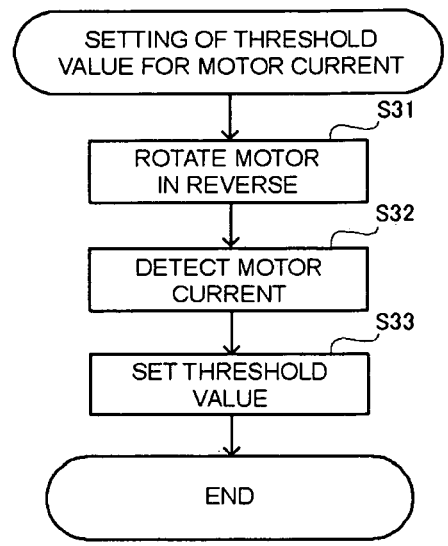
FIG. 8 is a flowchart illustrating threshold value setting processing for a motor current according to an exemplary embodiment.
Figure 12:
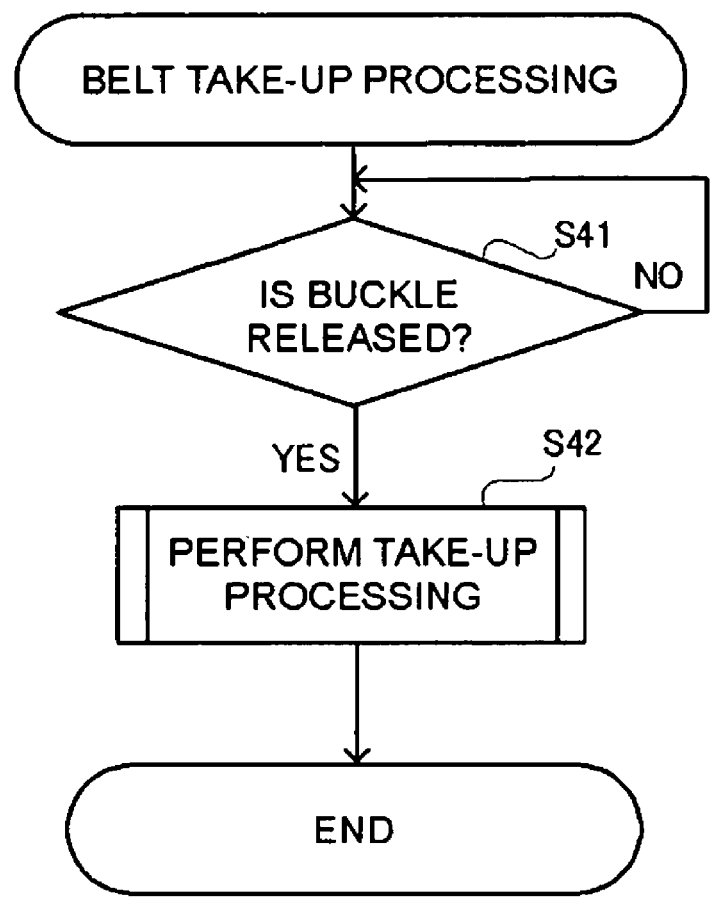
FIG. 12 is a flowchart illustrating belt take-up processing according to an exemplary embodiment.

A seat belt retractor 10 according to an exemplary embodiment performs processing steps in FIGS. 8 and 12 in place of those in FIG. 4.

The seatbelt retractor 10 performs a series of processing steps (setting a threshold value for a motor current) as shown in FIG. 8 immediately after the ignition key of a vehicle is turned on. In step 31 of the processing steps in FIG. 8, the CPU 111 causes the motor 121 to be reversed (run only to sustain its running) under predetermined conditions in a direction opposite to the direction in which the seatbelt is retracted, namely, the direction in which the one-way clutch 124*a* is not engaged. At this time, the motor 121 has a torque substantially equal to the magnitude of loss or the magnitude of mechanical loss mainly resulting from friction or the like.

Specifically, the seatbelt apparatus 30 (FIG. 3) according to this embodiment has the one-way clutch 124*a*. For this reason, when the motor 121 is reversed, motor load is hardly affected by an urging force from the return spring 124. In addition, since the motor 121 runs only to sustain its running, almost no external load (motor load) is exerted on the rotating shaft of the motor 121. Accordingly, the motor 121, when reversed, has a torque equivalent to a torque associated with nearly no motor load.

In the following step S32, the CPU 111 uses a current sensor 113 to detect a motor current (hereinafter referred to as a motor current during the reverse rotation) while causing the motor 121 to be reversed.

Figure 9:
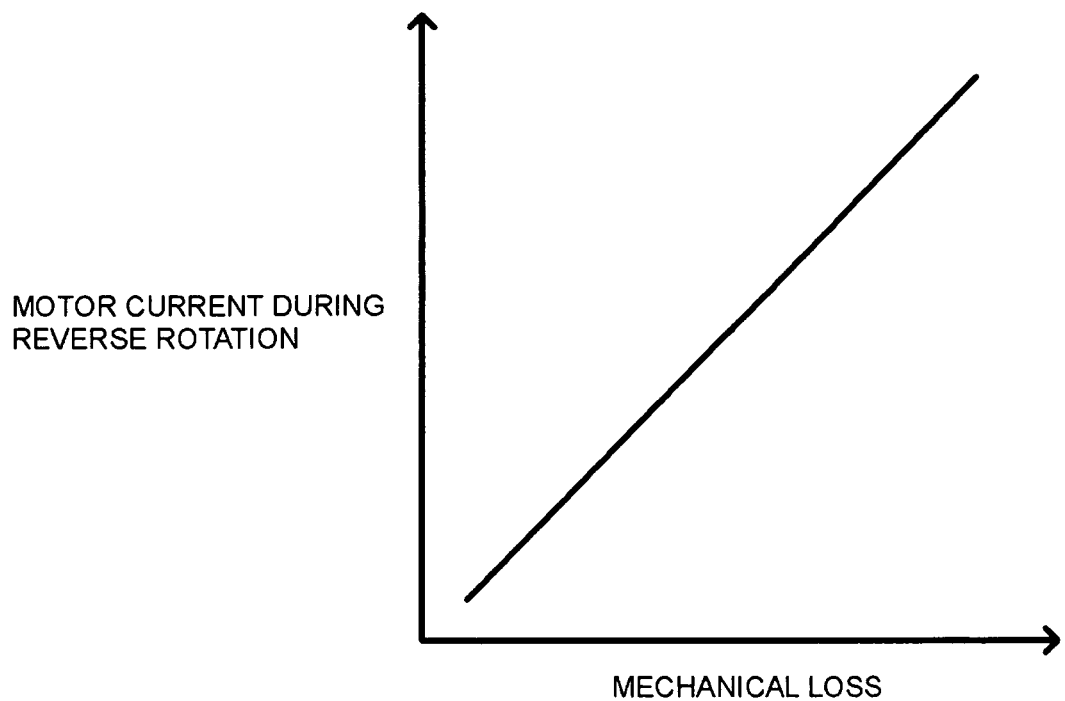
FIG. 9 is a graph showing an example of a relationship between a motor current during reverse rotation and mechanical loss.
Figure 10:
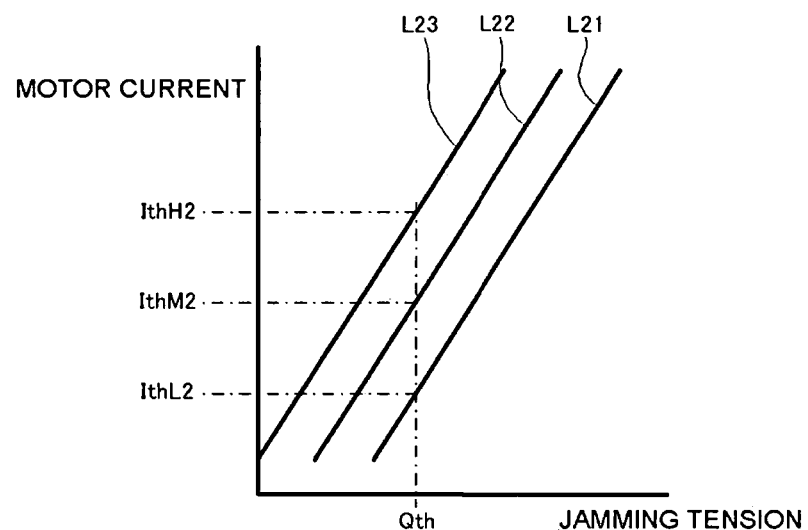
FIG. 10 is a graph showing an example of a relationship between a motor current and jamming tension according to an exemplary embodiment.

The motor current and the mechanical loss during the reverse rotation have a proportional relationship as shown in FIG. 9. Also, as shown in FIG. 10, a graph depicting a relationship between the motor current and the jamming tension corresponding to the current versus load characteristics of the motor 121 varies with mechanical loss (or the motor current during the reverse rotation). Specifically, a greater mechanical loss, namely, Line L23 (large loss characteristics) produces a greater motor current relative to motor load than Line L22 (medium loss characteristics), and Line L22 produces a greater motor current than Line L21 (small loss characteristics). Accordingly, the current versus load characteristics can be detected (determined) on the basis of the motor current during the reverse rotation. For example, for a small motor current during the reverse rotation, Line L21 corresponds to the small motor current versus load characteristics, for a medium motor current during the reverse rotation, Line L22 corresponds to the medium motor current versus load characteristics, and for a large motor current during the reverse rotation, Line L23 corresponds to the large motor current versus load characteristics. As just described above, in this embodiment, the motor current during the reverse rotation provides an indicator of the current versus load characteristics.

In the following step S33, according to a motor current during the reverse rotation the CPU 111 sets a motor current corresponding to a jamming tension as a threshold value for jamming determination. In an example as shown in, for example, FIG. 10, when a jamming tension is a value Qth, a current value IthL2 on Line L21, a current value IthM2 on Line L22, and a current value IthH2 on Line L23 are set as threshold current values for a small motor current during the reverse rotation, a medium motor current during the reverse rotation, and a large motor current during the reverse rotation, respectively.

Figure 11:
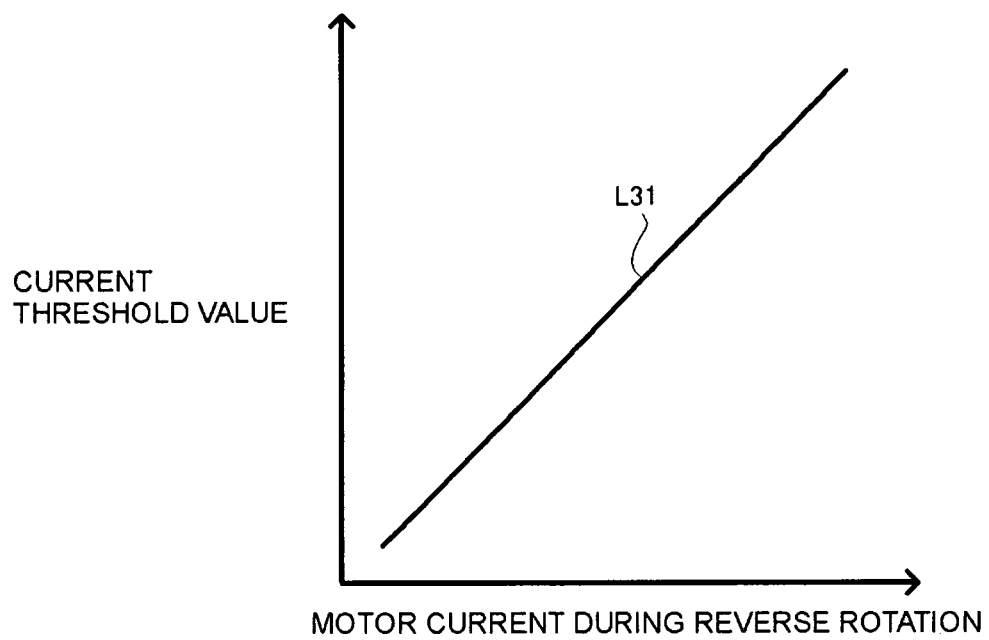
FIG. 11 is a graph showing an example of a map for use in setting of a threshold value for jamming determination according to an exemplary embodiment.

To set a threshold value for jamming tension, it is effective to, for example, provide a map of the relationship between the motor current during the reverse rotation and the motor current corresponding to jamming tension and store the map in, for example, the data storage section 114. This allows the threshold current to be set using the map. Specifically, a threshold value is set using the linear map L31 as shown in, for example, FIG. 11. Any map can be used depending on the relationship between the motor current during the reverse rotation and the motor current corresponding to jamming tension.

In step S33, the CPU 111 sets (updates or corrects) the motor current corresponding to the jamming tension as a threshold value.

Also, the CPU 111 repeatedly performs, for example, steps of processing as shown in FIG. 12.

In step S41 of the processing steps as shown in FIG. 12, the CPU 111 repeatedly determines whether or not the buckle 35 is released on the basis of a signal from the seatbelt fastening sensor 22. Then, if the CPU 111 detects in this step S41 that the buckle 35 is released, in step S42 the CPU 111 performs take-up processing as shown in FIG. 7.

According to an exemplary embodiment, the seatbelt retractor 10 causes the motor 121 to be reversed through steps of processing described above immediately after the ignition key of a vehicle is turned on, and detects a motor current during the reverse rotation. Then, a threshold value for jamming determination is set on the basis of the motor current during the reverse rotation. On the basis of the determination as to whether or not the motor current associated with take-up operation exceeds the threshold value, it is determined whether the belt 31 is jammed during the take-up operation. This allows the motor current corresponding to jamming tension to be set with a higher degree of accuracy on the basis of the motor current during the reverse rotation. Consequently, seatbelt jamming can be determined with a higher degree of accuracy.

Although the motor surrounding temperature is periodically detected, the temperature may be detected at other frequencies or instances in other exemplary embodiments. For example, the motor surrounding temperature may be detected only once immediately before take-up processing of the belt 31 is performed.

Although a series of processing steps as shown in FIG. 8 are performed immediately after the ignition key of a vehicle is turned on, the processing steps may be performed at other times. For example, the processing steps in FIG. 8 may be performed at any time when the motor 121 can be reversed, such as when the vehicle stops.

The embodiments described above may be combined. In other words, the CPU 111 causes the motor 121 to be reversed through the processing steps in FIG. 8 immediately after the ignition key of a vehicle is turned on. The motor current is detected while the motor 121 is being reversed. Then, the motor surrounding temperature is detected on a periodical basis through processing steps in FIG. 4. Every time the detection is made, a threshold value for jamming determination is set on the basis of the detected motor surrounding temperature. Then, on the basis of the determination as to whether or not the motor current associated with take-up operation exceeds the threshold value, it is determined whether the belt 31 is jammed during take-up operation. This allows the motor current corresponding to jamming tension to be set with a higher degree of accuracy on the basis of the motor surrounding temperature and the motor current during the reverse rotation. By combining both of them, seatbelt jamming can be determined with a higher degree of accuracy. In this case, it is effective to map in advance the relationship among the motor surrounding temperature, the motor current during the reverse rotation, and the motor current corresponding to jamming tension and store the map in the data storage section 114. This allows the threshold value to be set using the map.

When a threshold value is set using the motor surrounding temperature or the motor current during the reverse rotation in each of the embodiments above, a value subjected to correction is stored in the data storage section 114 for use as the setting value without modification. However, the embodiment of the present invention is not limited to this. For example, an initial value and a correction factor corresponding to the initial value may be stored in the data storage section 114, and a setting value may be obtained by calculation when a control parameter is used.

The order of the processing steps according to the embodiments above is not limited to the order shown in the flowcharts. Changes may be made to the order within the scope of the present invention.

The programs according to the embodiments above may be distributed in the form of computer readable recording media, such as a flexible disk, a CD-ROM (Compact Disk Read-Only Memory), a DVD (Digital Versatile Disk), and an MO (Magneto-Optical disk). In this case, the processing steps described above may be performed by installing the programs in a predetermined computer. Also, the programs according to the embodiments above may be stored in the storage unit (hard disk or the like) of a server provided on a communication network (for example the Internet or an intranet), and may be down-loaded to a local computer through, for example, superimposing on a carrier wave or may be read out from the server as needed to a local computer in which the programs are activated and executed. If part of the functions is performed by an OS (Operating System), only part of the functions other than performed by the OS may be distributed or transferred.

Means for implementing the functions of the ECU 111 is not limited to software, and a part or the whole of them may be implemented by dedicated hardware.

Depending on applications, the apparatus configuration as shown in FIGS. 1 to 3 may be accordingly changed. For example, the motor surrounding temperature sensor 121a may be omitted if the motor surrounding temperature is not detected or it can be detected by other approaches.

The one-way clutch 124a is not an essential component, and may be omitted if the motor current during the reverse rotation is not detected or it can be measured without the use of the one-way clutch 124a. For example, for a small urging force of the return spring 124 or a large tolerance of measurement, the one-way clutch 124a may be omitted.

If the motor 121 is not caused to be reversed, a motor that rotates only in one direction may be used.

Although the embodiments described above are described using an example where a seatbelt apparatus 30 is installed on the seat of a motor vehicle, the embodiments are not limited to a motor vehicle, and may be applied to the seats of other vehicles such as aircraft.

The priority application, Japanese Patent Application No. 2008-295700, filed Nov. 19, 2008 including the specification, drawings, claims and abstract, is incorporated herein by reference in its entirety.

The construction and arrangements of the seatbelt apparatus, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A seatbelt control apparatus comprising:
a controller for controlling a motor that provides a force for retracting a seatbelt;
a sensor that detects a motor current of the motor;
wherein the controller is configured to determine whether or not the seatbelt is jammed during a seatbelt take-up operation on a basis of whether or not the motor current detected by the sensor exceeds a threshold value for jamming determination; and
a detector that detects an indicator of a current versus load characteristic of the motor;
wherein the controller is configured to set the threshold value for jamming determination on a basis of the indicator detected by the detector.

2. The seatbelt control apparatus according to claim 1, wherein the detector is configured to detect a surrounding temperature of the motor, and wherein the controller is configured to set the threshold value for jamming determination on a basis of the surrounding temperature of the motor.

3. The seatbelt control apparatus according to claim 1, wherein the detector is configured to detect the motor current when the motor is rotated under a predetermined condition, and wherein the controller is configured to set the threshold value for jamming determination on a basis of the motor current detected by the detector.

4. The seatbelt control apparatus according to claim 3, wherein the detector is configured to detect the motor current when the motor is rotated in a direction opposite to a direction in which the seatbelt is retracted.

5. The seatbelt control apparatus according to claim 1, wherein the detector detects a surrounding temperature of the motor and the motor current when the motor is rotated under a predetermined condition, and wherein the controller is configured to set the threshold value for jamming determination on a basis of the surrounding temperature of the motor and the motor current detected by the detector.

6. A seatbelt apparatus comprising:
a motor and a sensor for detecting a motor current of the motor;
a spool that takes up a seatbelt in conjunction with rotation of the motor, the spool being connected to a rotating shaft of the motor;
a controller that controls the motor;
wherein the controller is configured to determine whether or not the seatbelt is jammed during a take-up operation on a basis of whether or not the motor current exceeds a threshold value for jamming determination; and
a detector configured to detect an indicator of a current versus load characteristic of the motor;
wherein the controller is configured to set the threshold value for jamming determination on a basis of the indicator detected by the detector.

7. The seatbelt apparatus according to claim 6, further comprising a one-way clutch, wherein the rotating shaft of the motor is connected to the spool via the one-way clutch, and wherein the detector is configured to detect the motor current when the motor is rotated in a direction in which an engagement with the one-way clutch is not attained.

8. A seatbelt control method, comprising the steps of:
detecting a motor current of a motor for retracting a seatbelt;
determining whether or not the seatbelt is jammed during a take-up operation of the seatbelt on a basis of whether or not the motor current detected by the motor current detecting step exceeds a threshold value for jamming determination;
detecting an indicator of a current versus load characteristic of the motor; and
setting the threshold value for jamming determination on a basis of the indicator detected by the indicator detecting step.

* * * * *